United States Patent

Poggenburg et al.

[11] Patent Number: 5,499,867
[45] Date of Patent: Mar. 19, 1996

[54] METHOD FOR MINIMIZING AMPLITUDE OF PRESSURE MODULATION IN AN ABS

[75] Inventors: Rüdiger Poggenburg, Vaihingen; Bernd Grossardt, Boennigheim; Eberhard Sonntag, Oberriexingen, all of Germany

[73] Assignee: Robert Bosch GmbH, Stuttgart, Germany

[21] Appl. No.: 369,826

[22] Filed: Jan. 6, 1995

[30] Foreign Application Priority Data

Jan. 29, 1994 [DE] Germany .......................... 44 02 652.8

[51] Int. Cl.[6] .................................................... B60T 8/32
[52] U.S. Cl. .................................... 303/159; 303/156
[58] Field of Search .................................. 303/100, 103, 303/105, 106, 108, 156, 157, 158, 159; 364/426.01, 426.02

[56] References Cited

U.S. PATENT DOCUMENTS

| | | | |
|---|---|---|---|
| 3,637,264 | 1/1972 | Leiber et al. | 303/105 |
| 5,020,863 | 6/1991 | Yoshino | 303/100 X |
| 5,213,398 | 5/1993 | Becker | 303/100 |
| 5,244,258 | 9/1993 | Van Zanten et al. | 303/100 |
| 5,265,947 | 11/1993 | Wupper et al. | 303/DIG. 4 X |
| 5,332,299 | 7/1994 | Schäfer | 303/100 X |

Primary Examiner—Josie Ballato
Attorney, Agent, or Firm—Felfe & Lynch

[57] ABSTRACT

In an anti-lock braking system in which pressure is reduced in pulses separated by pressure maintenance phases, the duration of the first maintenance phase is dependent upon the vehicle deceleration and the wheel slip. A second pressure reduction pulse is triggered only when the wheel acceleration is less than a predetermined low threshold.

5 Claims, 2 Drawing Sheets

PULSE NO.  0   1   2   3   4   5   6

METHOD FOR MINIMIZING AMPLITUDE OF PRESSURE MODULATION IN AN ABS

PRIOR ART

U.S. Pat. No. 3,637,264 discloses an anti-lock regulating system (ABS) in which the brake pressure is varied by pulses, the ratio of pulse duration to pulse interval duration being dependent upon the wheel movement behavior. The purpose of the pulsing here is to vary the pressure build-up and reduction gradient.

Methods are known in which, upon wheel instability being detected, the actual wheel characteristic is determined immediately after the first pressure reduction and, according to whether or not this wheel characteristic indicates a further instability, a decision is made as to whether pressure reduction is to be continued or the pressure is to be maintained. In this connection the slip, the filtered wheel acceleration and the point of inflection and cusp of the wheel speed characteristic are used to estimate the wheel characteristic.

The disadvantage of this method arises on account of the phase difference between the physical wheel characteristic and that which is thus determined, particularly when the wheel dynamics are high, as is always the case when there is a high coefficient of friction. The pressure reduction is then initiated too late and a new pressure reduction follows, although reduction in braking quality in the absence of complex auxiliary measures.

SUMMARY OF THE INVENTION

The invention precludes the above-mentioned disadvantages, prevents unnecessarily high pressure modulation amplitudes, and improves the braking quality. Powerful reactions at the brake pedal are also prevented. This is accomplished by making the duration of the pressure maintenance phase following the first reduction pulse dependent upon the vehicle deceleration and wheel slip, and triggering a second reduction pulse only when the wheel acceleration exceeds a predetermined low threshold.

According to a development of the invention a continuous pressure reduction is initiated after a predetermined number of pressure reduction and maintaining phases, which reduction is then terminated by the occurrence of a slight wheel acceleration.

The pulse sequence for the pulses and intervals is preferably determined by a counter such that each pulse and each interval can be identified with an odd-numbered and an even-numbered count (e.g. counter=even then maintaining phase counter=odd then reduction).

DETAILED DESCRIPTION OF THE PREFERRED EMBODIMENT

Figure 1:
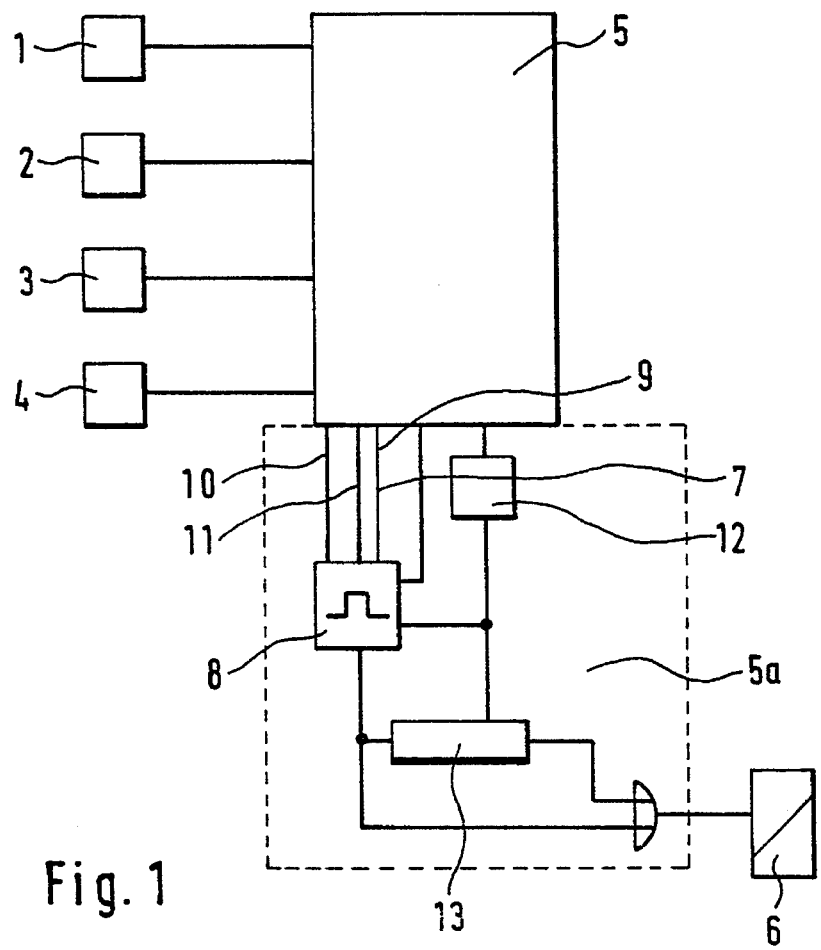
FIG. 1 is a schematic of the system for practicing the invention.

In FIG. 1 speed sensors 1 to 4 are associated with the wheels and deliver the determined wheel speed signals to an evaluation circuit 5, which is extended by a part 5a. For the sake of simplicity only the actuation of a brake pressure control valve 6, which is associated with the wheel having the sensor 1, is illustrated in FIG. 1. This valve would be a ⅗-valve which can build up, maintain and reduce brake pressure.

The wheel deceleration −a, wheel acceleration +a, wheel slip $\lambda$ and a reference speed $V_F$ which is approximated to the vehicle characteristic, are determined in the evaluation circuit 5. The gradient of the reference speed corresponds to the vehicle deceleration $V_F$ which is also determined in the evaluation circuit.

Figure 2:
FIG. 2 is a diagram of the pressure reduction and maintenance pulses at a wheel which exhibits slippage.

The above-mentioned quantities are combined in the evaluation circuit 5 in an instability criterion I, which is a function of wheel deceleration, wheel slip, and vehicle reference speed, and compared with a threshold. See the discussion of instability in the Bosch "Automotive Handbook" English edition (1993) at p. 610. If the threshold is exceeded, a pressure reduction signal is generated at a line 7. This activates a pulse generator 8, which delivers a pressure reduction pulse of a predetermined duration (e.g. 10 ms). The pulse duration may alternatively be determined by the previous history (previous reduction time), as indicated by a broken line 9. This pulse of duration tav1 controls the valve so that it moves into the reduction position. The pulse generator then controls the valve so that it moves into the first maintaining phase. The duration tp1 of the first maintaining phase is made dependent upon the coefficient of friction of the road, which is determined from the vehicle deceleration $V_F$ provided on line 10 and the wheel slip $\lambda$ provided on line 11. The duration tp1 is selected such that at a high coefficient of friction it lies in the order of magnitude of the time constants which are typical of this coefficient of friction and the conditions which are specific to the vehicle, i.e., tp1 is dependent on the vehicle specifications and the friction coefficient of the road. When the coefficient of friction is low, the duration tp1 moves towards 0 (e.g. 30 ms). The completion of this duration tp1 is again followed by a pressure reduction pulse of duration tav2 where the wheel acceleration is less than a threshold (e.g. 0.7 g) in unit 12 at the end of the maintaining phase. Here tav2=tav1 according to the signal on line 7. Such a signal may depend on whether the wheel acceleration exceeds the same threshold which determined acceleration for the purpose of preventing the second pressure reduction pulse. After n reduction pulses and n maintaining pulses (n e.g. 3) there is then a change to continuous reduction tav (FIG. 2). This is effected by a counter 13, which takes over the actuation of the valve 6 after the nth maintaining phase and is reset when an acceleration signal occurs. Such a signal may depend on whether the wheel acceleration exceeds the same threshold which determines acceleration for the purpose of preventing the second pressure reduction pulse.

The following apply to the individual durations of pressure maintenance phases:

$tp1=C1*V_F+K1-K2*\lambda$ $tp2=C2$

C1, C2, K1, K2 are constants which are specific to the vehicle and which may, for example, assume the following values.

C1=1 c2=15 ms

K1=50

K2=6

What is claimed is:

1. A method for controlling brake pressure at the wheels of a vehicle, comprising measuring the wheel speeds, determining a wheel acceleration at each said wheel based on the respective wheel speed, determining a slip value at each wheel based upon said wheel speeds, determining a vehicle deceleration based upon said wheel speeds, generating a first pressure reduction pulse at one of said wheels based upon the slip value at said one of said wheels, maintaining pressure at said one of said wheels for a duration tp1 following said first pressure reduction pulse, said duration tp1 being based on said slip value at said one of said wheels and said vehicle deceleration, and triggering a second pressure reduction pulse only when the wheel acceleration of said one of said wheels is less than a predetermined threshold.

2. A method as in claim 1 wherein said predetermined threshold is 0.7 g.

3. A method as in claim 1 further comprising maintaining said pressure for a predetermined duration tp2 following said second pressure reduction pulse.

4. A method as in claim 3 wherein tp2=tp1.

5. A method as in claim 3 wherein, after a predetermined number of pressure reduction pulses followed by pressure maintenance phases, pressure is reduced continuously until said wheel acceleration exceeds said predetermined threshold.

* * * * *

UNITED STATES PATENT AND TRADEMARK OFFICE
CERTIFICATE OF CORRECTION

Figure 2A:
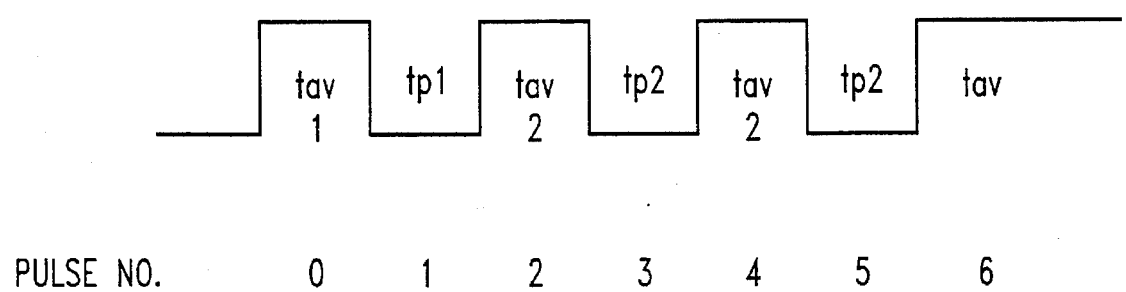
FIG. 2a is a diagram as in FIG. 2 wherein the first pressure maintenance pulse is of like duration as succeeding pressure maintenance pulses.

PATENT NO. : 5,499,867
DATED : March 19 1998
INVENTOR(S) : Rudiger POGGENBURG; Bernd GROSSARDT; Eberhard SONNTAG It is certified that error appears in the above-indentified patent and that said Letters Patent is hereby corrected as shown below:

In Column 1, line 65 of the patent, please delete the second occurrence of the paragraph "FIG.2a is a diagram as in FIG.2 wherein the first pressure maintenance pulse is of like duration as succeeding pressure maintenance pulses."

In Column 2, line 46 of the patent, please delete "Such a signal may depend on whether the wheel acceleration exceeds the same threshold which determined acceleration for the purpose of preventing the second pressure reduction pulse." and insert -- The next reduction pulses have a duration tp2, which may be equal to tp1, as shown in Figure 2a, since tp1 is dependent on coefficient of friction. --.

Signed and Sealed this

Twenty-eighth Day of April, 1998

Attest:

BRUCE LEHMAN

*Attesting Officer*  *Commissioner of Patents and Trademarks*